(12) United States Patent
Yahagi et al.

(10) Patent No.: US 12,487,478 B2
(45) Date of Patent: Dec. 2, 2025

(54) OPTICAL ISOLATOR

(71) Applicant: SHIN-ETSU CHEMICAL CO., LTD., Tokyo (JP)

(72) Inventors: Akira Yahagi, Takasaki (JP); Shinji Makikawa, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 281 days.

(21) Appl. No.: 18/285,686

(22) PCT Filed: Mar. 28, 2022

(86) PCT No.: PCT/JP2022/014940
§ 371 (c)(1),
(2) Date: Oct. 5, 2023

(87) PCT Pub. No.: WO2022/230528
PCT Pub. Date: Nov. 3, 2022

(65) Prior Publication Data
US 2024/0118564 A1    Apr. 11, 2024

(30) Foreign Application Priority Data

Apr. 28, 2021   (JP) .................................. 2021-075903

(51) Int. Cl.
*G02F 1/09* (2006.01)
*G02B 27/28* (2006.01)

(52) U.S. Cl.
CPC ........... *G02F 1/093* (2013.01); *G02B 27/283* (2013.01)

(58) Field of Classification Search
CPC ...... G02F 1/093; G02B 27/283; G02B 27/286
USPC .............................. 359/280, 484.03; 372/703
See application file for complete search history.

(56) References Cited

U.S. PATENT DOCUMENTS

2004/0240031 A1*  12/2004  Azimi ..................... G02F 1/093
                                                           359/280
2011/0133111 A1*   6/2011  Makikawa ............. C30B 29/16
                                                           252/62.51 R
(Continued)

FOREIGN PATENT DOCUMENTS

JP        H10-123462 A    5/1998
JP        2000-235172 A   8/2000
(Continued)

OTHER PUBLICATIONS

Fukuda, Tsuguo, "Advanced Growth Technology and Application of Bulk Single Crystal," Mar. 2006, pp. 114-117, 164-169, 204-207, 261-263.

(Continued)

*Primary Examiner* — Ricky D Shafer
(74) *Attorney, Agent, or Firm* — Oliff PLC

(57) ABSTRACT

An optical isolator for a wavelength band of 400 to 470 nm includes: a Faraday rotator having a Verdet constant equal to or greater than 750 Rad/T·m at a wavelength of 400 nm to 470 nm; and a hollow magnet provided on an outer periphery of the Faraday rotator, wherein a magnetic flux density B(T) applied to the Faraday rotator is within the range of the following formula (1), and an optical path length L(cm) over which the Faraday rotator is provided is within the range of the following formula (2): B≤0.40 (1); 0.26≤L≤0.50 (2). Thus, a miniaturized optical isolator which is transparent at violet and blue wavelengths of 400 to 470 nm is provided.

16 Claims, 2 Drawing Sheets

(56) References Cited

U.S. PATENT DOCUMENTS

| | | | |
|---|---|---|---|
| 2011/0181950 A1 | 7/2011 | Makikawa et al. | |
| 2012/0236409 A1* | 9/2012 | Yahagi | C30B 15/08 451/28 |
| 2013/0222909 A1* | 8/2013 | Makikawa | C01F 17/224 252/62.51 R |
| 2013/0308187 A1 | 11/2013 | Shimamura et al. | |
| 2014/0002900 A1* | 1/2014 | Makikawa | G02F 1/0036 252/583 |
| 2014/0300963 A1 | 10/2014 | Yahagi et al. | |
| 2015/0015947 A1* | 1/2015 | Yahagi | C04B 35/505 359/484.03 |
| 2015/0185510 A1* | 7/2015 | Akira | G02F 1/0063 359/352 |
| 2016/0209683 A1 | 7/2016 | Ikari | |
| 2019/0366584 A1* | 12/2019 | Matsumoto | C04B 35/505 |
| 2022/0146866 A1* | 5/2022 | Yahagi | C04B 35/50 |

FOREIGN PATENT DOCUMENTS

| | | | |
|---|---|---|---|
| JP | 2011-150208 A | 8/2011 | |
| JP | 2012083381 A * | 4/2012 | G02F 1/093 |
| JP | 2016-109743 A | 6/2016 | |
| JP | 2017-007920 A | 1/2017 | |
| WO | 2012/133200 A1 | 10/2012 | |
| WO | 2013/085040 A1 | 6/2013 | |
| WO | 2015/008553 A1 | 1/2015 | |

OTHER PUBLICATIONS

"Crystal Growth Handbook," Sep. 1995, Japanese Association for Crystal Growth, pp. 284-285, 634-635.

Ikesue, Akio, "Single Crystal to Polycrystalline Materials with Optical Grade," Applied Physics, 2006, vol. 75, No. 5, pp. 579-583.

Yanagitani et al., "Current State and the Future of Ceramic Laser Material," Laser Review, 2008, vol. 36, No. 9, pp. 544-548.

Jun. 7, 2022 International Search Report issued in International Patent Application No. PCT/JP2022/014940.

Oct. 24, 2023 International Preliminary Report on Patentability issued in International Patent Application No. PCT/JP2022/014940.

Mar. 21, 2025 Search Report issued in European Patent Application No. 22795445.0.

Jan. 4, 2024 Office Action issue in Japanese Patent Application No. 2021-075903.

* cited by examiner

[FIG. 1]
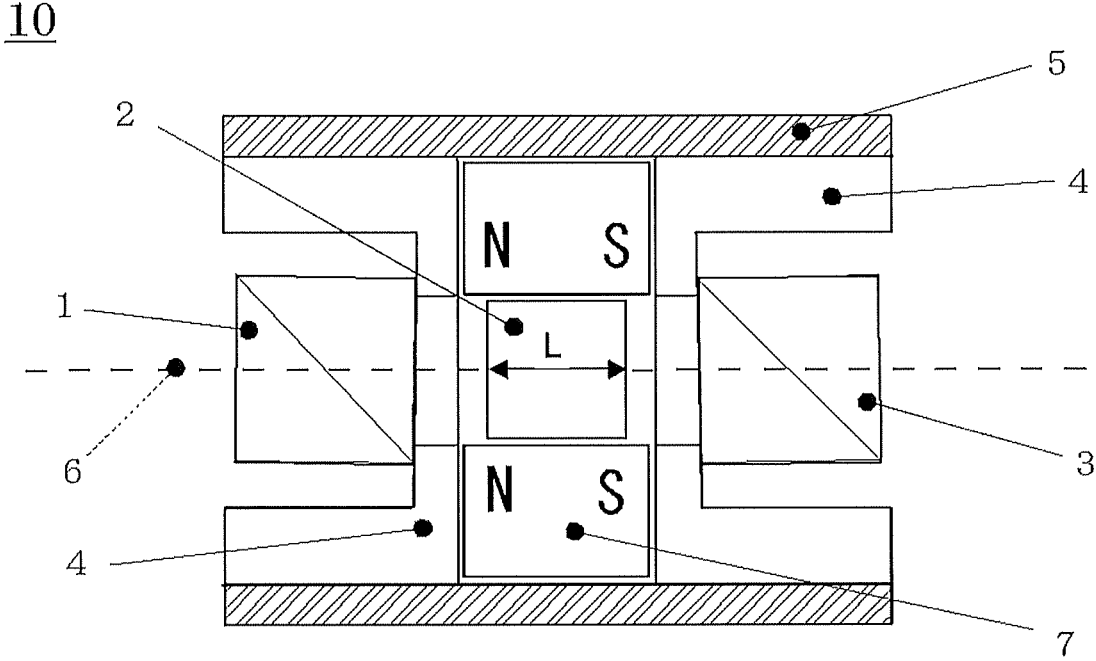
[FIG. 2]
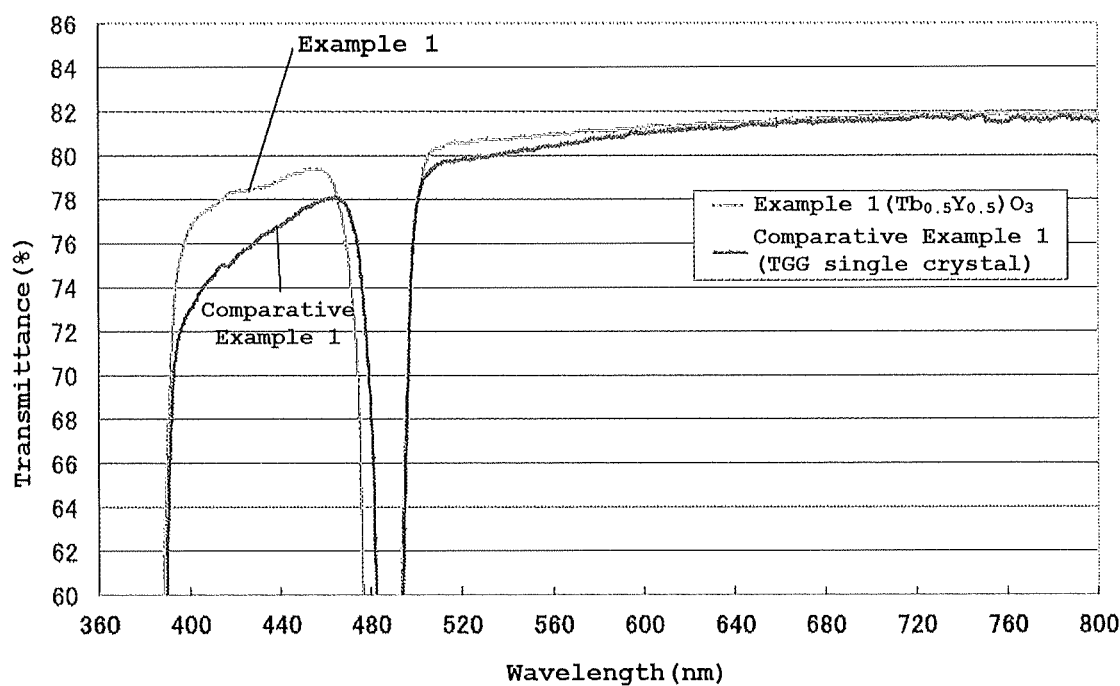

[FIG. 3]
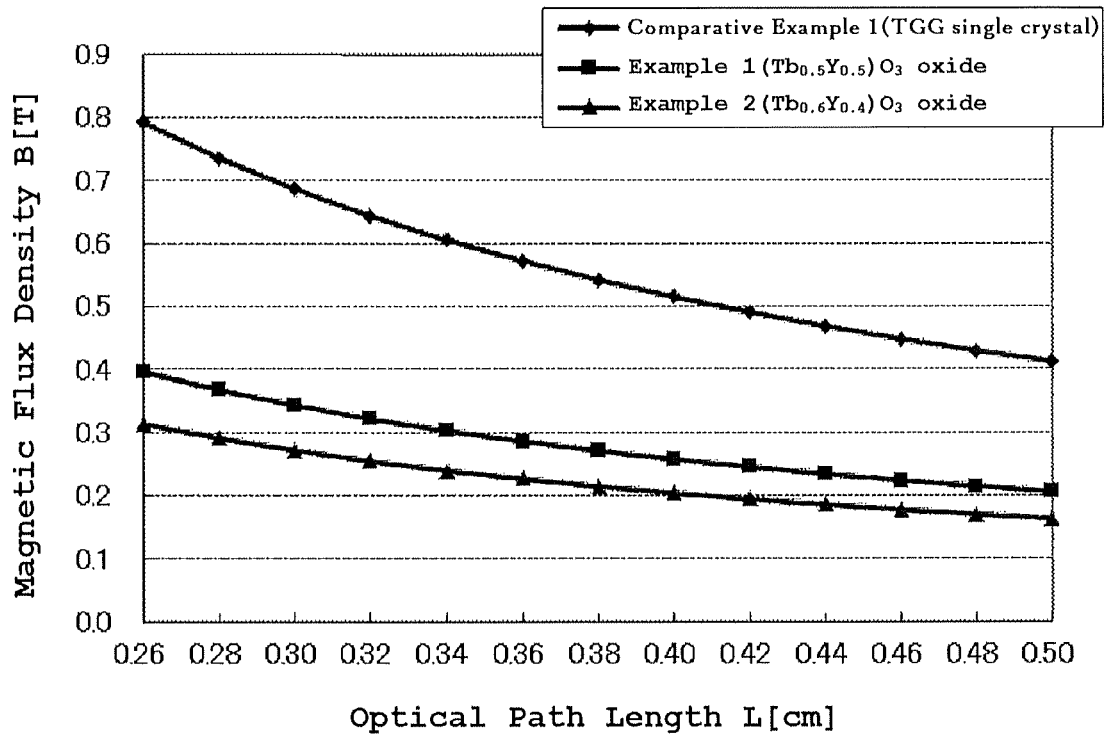
[FIG. 4]
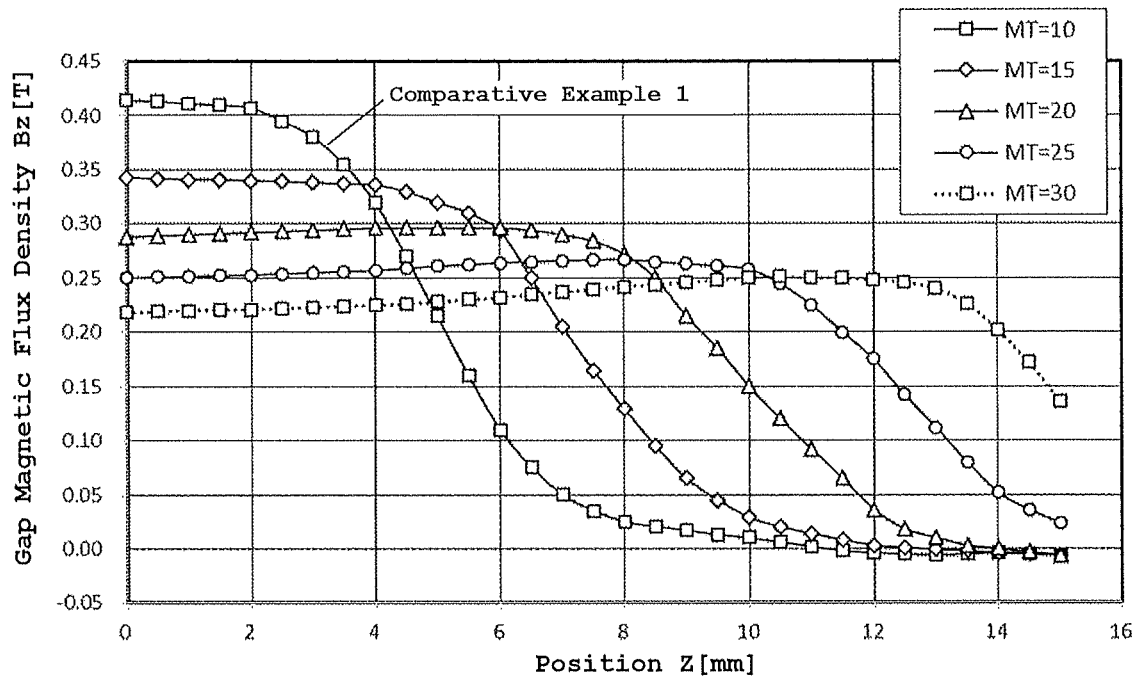

OPTICAL ISOLATOR

TECHNICAL FIELD

The present invention relates to an optical isolator for use at violet and blue wavelength bands of 400 to 470 nm.

BACKGROUND ART

A semiconductor laser has conventionally been used as an industrial laser for medical and optical measurement applications and the like, with a low power laser ranging from a few milliwatts to several hundred milliwatts. A Fabry-Perot type laser, which has a simple oscillation system and enables output at a wide range of wavelengths, has become mainstream.

Generally, a Fabry-Perot laser is a laser that emits light through stimulated emission obtained by applying an electric current to a resonator with two reflective surfaces formed by crystal cleavage or the like, the reflected surfaces facing each other at both ends of a path through which light travels. While it is characterized by a narrow emission spectrum and excellent conversion efficiency, it is extremely sensitive to optical feedback due to reflected light, and there is a danger that the laser oscillation will become unstable if the reflected light returns from an object to be measured. Therefore, for stable operation of a semiconductor laser, it is essential to provide an optical isolator, which transmits light in the forward direction and blocks light in the reverse direction, between a resonator and a lens to prevent reflected light from returning to a crystal element that serves as the resonator, thereby blocking returning light.

Here, the optical isolator consists of three main components: a Faraday rotator, a pair of polarizers provided on light input and output sides of the Faraday rotator, and a magnet that applies a magnetic field in the direction of light transmission (direction of optical axis) of the Faraday rotator. When light enters the Faraday rotator in this configuration, a phenomenon occurs in which the plane of polarization rotates in the Faraday rotator. This phenomenon is called the Faraday effect, and the angle of rotation of the plane of polarization is called the Faraday rotation angle. The magnitude thereof is represented by the following formula:

$$\theta = V \times H \times L$$

wherein V is the Verdet constant that is a constant determined by the material of the Faraday rotator and the measurement wavelength, H is the strength of the magnetic field, and L is the length (sample length) of the Faraday rotator (optical path length). As can be seen from this formula, in order to obtain a desired Faraday rotation angle in the rotator with a certain magnitude of the Verdet constant, the larger the magnetic field applied to the Faraday rotator, the shorter the length of the rotator can be, and the longer the length of the rotator, the smaller the magnetic flux density can be.

As described in Patent Document 1, there are cerium fluoride (chemical formula: $CeF_3$), praseodymium fluoride (chemical formula: $PrF_3$), and the like having a small absorption coefficient at a wavelength band of 400 nm or less.

Other materials having a large Verdet constant at violet and blue wavelength bands of 400 to 470 nm include a terbium gallium garnet (chemical formula: $Tb_3Ga_5O_{12}$) single crystal, as described in Patent Document 2.

The Faraday rotation angle of about 45° is required for achieving the function of an optical isolator. Specifically, the plane of polarization of incident light on the optical isolator is rotated at 45° by the Faraday rotator, and the light is transmitted through input/output polarizers whose angles are respectively adjusted. On the other hand, the plane of polarization of returning light is rotated at 45° in the opposite direction by utilizing the non-reciprocity of the Faraday rotator to give an orthogonal plane of polarization at 90° to the input polarizer so that the light cannot be transmitted. The optical isolator utilizes this phenomenon to transmit light in only one direction and block back-reflected light.

CITATION LIST

Patent Literature

Patent Document 1: WO 2012/133200 A1
Patent Document 2: JP 2011-150208 A

SUMMARY OF INVENTION

Technical Problem

The praseodymium fluoride described in Patent Document 1 has large optical absorption at a wavelength of 420 to 500 nm. Therefore, it cannot be used in a wavelength region of 400 to 470 nm because of its strong effect of absorption. On the other hand, the cerium fluoride can be used at a wavelength of 500 nm or less and but no less than 300 nm because it has no significant optical absorption, but the Verdet constant thereof is 414 Rad/T·m at a wavelength of 400 nm which is smaller than the constant value of 430 Rad/T·m for TGG at the same wavelength as described in Patent Document 2. Therefore, it is difficult to produce a compact optical isolator; though TGG had a relatively large Verdet constant in comparison with the aforementioned fluoride, the value of the Verdet constant was not outstanding and thus, it was difficult to produce an even smaller isolator.

In recent years, a semiconductor laser for medical and optical measurement applications requires multiple laser modules in a single device, and there are also applications where two isolators are provided to further increase the resistance of a semiconductor laser to returning light. Therefore, the need for a more compact isolator is increasing.

The present invention aims to provide a miniaturized optical isolator which is transparent at violet and blue wavelengths of 400 to 470 nm. In particular, the object of the present invention is to provide a compact optical isolator suitable for use as an optical isolator for a semiconductor laser used in medical and optical measurement applications and the like.

Solution to Problem

To achieve the object, the present invention provides an optical isolator for a wavelength band of 400 to 470 nm, comprising:
  a Faraday rotator having a Verdet constant equal to or greater than 750 Rad/T·m at a wavelength of 400 nm to 470 nm; and
  a hollow magnet provided on an outer periphery of the Faraday rotator, wherein a magnetic flux density B (T) applied to the Faraday rotator is within the range of the following formula (1), and an optical path length L (cm) over which the Faraday rotator is provided is within the range of the following formula (2).

$$B \leq 0.40 \tag{1}$$

$$0.26 \leq L \leq 0.50 \tag{2}$$

According to the present invention, it is possible to achieve miniaturization of an optical isolator that is transparent at 400 to 470 nm by using a Faraday rotator having a large Verdet constant at a wavelength of 400 nm to 470 nm and a magnet material having a smaller magnetic flux density.

Further, according to the present invention, it is possible to provide an optical isolator that utilizes a Faraday rotator with the great Faraday effect in combination with a magnet having a small external form.

It is preferable that the Faraday rotator contains 95% or more of an oxide represented by the following formula (I), $$(Tb_xR_{1-x})_2O_3 \tag{I}$$

wherein x satisfies $0.5 \leq x \leq 1.0$, and R contains at least one element selected from the group consisting of scandium, yttrium, and lanthanoid elements other than terbium.

In such optical isolator, since the content of the oxide represented by the formula (I): $(Tb_xR_{1-x})_2O_3$, which affects the polarization rotation performance, is 95% or more in the Faraday rotator, the optical path length over which the Faraday rotator is provided can be shortened by about ½ as compared to a case where a Faraday rotator with the content of the oxide of 50% is used. Thus, it is possible to provide an isolator with a smaller outer diameter and a shorter length.

The oxide is preferably a single crystal or a ceramic, more preferably a ceramic not limited to a single crystal because it can be synthesized at a low temperature.

It is preferable that the Faraday rotator has an insertion loss of 1 dB or less and an extinction ratio of 30 dB or more for the optical path length L(cm) that satisfies the formula (2).

This enables the optical isolator to have optical properties including a lower loss and higher isolation.

It is preferable that the optical isolator further comprises a pair of polarizers provided so as to sandwich the Faraday rotator therebetween along an optical axis, wherein each of the polarizers is a polarizing beam splitter having an insertion loss of 0.5 dB or less and an extinction ratio of 30 dB or more.

This enables the optical isolator to have optical properties including a lower loss and higher isolation.

Advantageous Effects of Invention

As described above, the optical isolator according to the present invention can be made as a miniaturized optical isolator which is transparent at violet and blue wavelengths of 400 to 470 nm.

BRIEF DESCRIPTION OF DRAWINGS

FIG. 1 is a cross-sectional schematic illustration showing a configuration example of the optical isolator of the present invention;

FIG. 2 is an illustration showing wavelength characteristics of transmittance of the Faraday rotators (without AR coating) used in Example 1 and Comparative Example 1;

FIG. 3 is an illustration showing the magnitude of the magnetic flux density B (T: $10^4$Oe) which gives the Faraday rotation angle of 45° for the optical path length L (0.26 to 0.50 cm), over which the Faraday rotators used in Examples 1 and 2 and Comparative Example 1 are provided; and FIG. 4 is a simulation diagram of the calculated magnetic flux density to be applied to the Faraday rotator used in Comparative Example 1.

DESCRIPTION OF EMBODIMENTS

As described above, it has been demanded to develop a miniaturized optical isolator which is transparent at violet and blue wavelengths of 400 to 470 nm.

As a result of the intensive studies for solving the aforementioned problems, the inventors found that miniaturization, which could not be achieved with a conventional optical isolator for violet and blue wavelengths, can be achieved by using a Faraday rotator having a Verdet constant equal to or greater than 750 Rad/T·m at a wavelength of 400 nm to 470 nm with a magnetic flux density B (T) applied to the Faraday rotator being 0.40 T or less and an optical path length (sample length) L (cm) over which the Faraday rotator is provided being between 0.26 cm and 0.50 cm, inclusive, and completed the present invention.

That is, the present invention is an optical isolator for a wavelength band of 400 to 470 nm, comprising:

a Faraday rotator having a Verdet constant equal to or greater than 750 Rad/T·m at a wavelength of 400 nm to 470 nm; and a hollow magnet provided on an outer periphery of the Faraday rotator, wherein a magnetic flux density B(T) applied to the Faraday rotator is within the range of the following formula (1), and an optical path length L(cm) over which the Faraday rotator is provided is within the range of the following formula (2).

$$B \leq 0.40 \tag{1}$$

$$0.26 \leq L \leq 0.50 \tag{2}$$

Since the Faraday rotator used in the present invention is a transparent Faraday rotator with sufficiently low optical absorption at a wavelength of 400 to 470 nm to be practicable, it is available for a wavelength band where a conventional rotator such as praseodymium fluoride cannot not function. In addition, by using a Faraday rotator with a large Verdet constant and providing a compact magnet material having a smaller magnetic flux density, miniaturization of the optical isolator was achieved. This allowed the greater degree of freedom in spatial dimensions within the device in which the optical isolator was incorporated.

In detail, the size of the optical isolator depends largely on the optical path length L over which the Faraday rotator is provided, and the size of the magnet. The size of the magnet depends on the magnitude of the magnetic flux density B(T). Since the magnetic flux density B(T) of the magnet satisfies the formula (1): $B \leq 0.40$, it is possible to miniaturize the magnet. Although the lower limit of the magnetic flux density B is not particularly limited, the magnetic flux density B can be, for example, 0.10 T or more. Since such miniaturized magnet is provided and the optical path length L(cm) over which the Faraday rotator is provided satisfies the formula (2): 0.26≤L≤0.50, further miniaturization can be achieved. Furthermore, by using the Faraday rotator having a Verdet constant equal to or greater than 750 Rad/T·m at a wavelength of 400 nm to 470 nm while satisfying the formulae (1) and (2), it is possible to achieve the Faraday rotation angle of about 45°, which is required to function as an optical isolator.

Hereinafter, the present invention will be described in detail. However, the present invention is not limited thereto.

The isolator of the present invention is used for a laser beam at a wavelength band of 400 to 470 nm. Such laser includes a Fabry-Perot type laser that allows a wide range of wavelength output with a simple configuration.

It should be noted that a person skilled in the art can modify the design of the isolator of the present invention for laser beams at wavelength bands other than those mentioned above.

Hereinafter, the basic configuration example of the optical isolator of the present invention will be described with reference to the drawings.

FIG. 1 is a cross-sectional schematic illustration showing a configuration example of the optical isolator of the present invention.

In an optical isolator 10 shown in FIG. 1, an input polarizer 1, a Faraday rotator 2, and an output polarizer 3 are arranged sequentially on an optical axis 6 from the input side on the left to the output side on the right.

In FIG. 1, the input polarizer 1 is fixed to a polarizer holder 4 on the input side, and the output polarizer 3 is fixed to a polarizer holder 4 on the output side. Such polarizer holders 4 are fixed to a metal holder 5 that serves as an outer case.

Although the shape of the Faraday rotator 2 is not particularly limited and may be a triangular or square column, it is preferably cylindrical. Hereinafter, an example of a cylindrical Faraday rotator will be described.

A hollow magnet 7 is provided on the outer periphery of the Faraday rotator 2. If the Faraday rotator 2 is cylindrical, the hollow magnet 7 is preferably cylindrical and the central axis of the Faraday rotator 2 is preferably coaxial with the central axis of the hollow portion of the hollow magnet 7. Further, it is preferable that the outer diameter of the Faraday rotator 2 is approximately the same as the inner diameter of the hollow portion of the hollow magnet 7, and alignment is performed after the optical isolator is assembled. This arrangement places the Faraday rotator 2 in the center of the hollow portion of the hollow magnet 7.

In other words, as shown in FIG. 1, the optical isolator according to the present invention includes the Faraday rotator 2 and the hollow magnet 7 provided on the outer periphery of the Faraday rotator 2. Additionally, the optical isolator 10 preferably further comprises a pair of polarizers 1 and 3 provided so as to sandwich the Faraday rotator 2 therebetween along the optical axis 6. The dimension L along the optical axis 6 among the dimensions of the Faraday rotator 2 shown in FIG. 1 corresponds to the optical path length L (cm) over which the Faraday rotator is provided.

The optical isolator of the present invention includes a Faraday rotator having a Verdet constant equal to or greater than 750 Rad/T·m at a wavelength of 400 to 470 nm as the Faraday rotator. This Faraday rotator is to be described.

The Faraday rotator that can be used in the present invention has a Verdet constant equal to or greater than 750 Rad/T·m at a wavelength of 400 to 470 nm. Although the Verdet constant is not particularly limited so far as it is 750 Rad/T·m or greater, the upper limit is the Verdet constant for a terbium oxide content of 100% (1420 Rad/T·m). If the Verdet constant is less than 750 Rad/T·m, the length of the Faraday rotator required to obtain the Faraday rotation angle of 450 becomes longer, and it is difficult to miniaturize the optical isolator.

In the present invention, a Verdet constant may be measured in accordance with the usual method, and the method of measurement is not particularly limited.

Specifically, an oxide of a given thickness is cut out, subjected to mirror polishing finish, and, as the Faraday rotator, is set on a permanent magnet with a known magnitude of a magnetic flux density, and a Verdet constant at a wavelength of 400 to 470 nm is measured. In addition, the measurement temperature is 25±10° C. and the measurement is performed in atmosphere.

In the optical isolator of the present invention, the optical path length L (cm) over which the Faraday rotator is provided is within the range of the following formula (2).

$$0.26 \leq L \leq 0.50 \quad (2)$$

If the optical path length (also called sample length) exceeds 0.50 cm, it becomes difficult to miniaturize the isolator. If the length is less than 0.26 cm, the magnitude of the magnetic flux density to obtain the desired Faraday rotation angle becomes larger, again making it difficult to miniaturize the optical isolator.

The Faraday rotator used in the present invention preferably contains 95% or more of an oxide represented by the following formula (I), and may have sintering aids other than the oxide.

$$(Tb_xR_{1-x})_2O_3 \quad (I)$$

Preferably, the content of the above oxide is 99% or more by mass, more preferably 99.9% or more by mass, and particularly preferably 100% by mass.

The oxide represented by the above formula (I) is preferably a single crystal or a ceramic, more preferably a ceramic not limited to a single crystal because it can be synthesized at a low temperature.

The above metal oxide is contained, for example, as a dopant to be added during fabrication of a single crystal or a sintering aid to be added during fabrication of a ceramic. Constituents of a crucible or the like may also be mixed in as a by-product when producing the materials of the Faraday rotator.

It is preferable to select, as the sintering aid, any one or more of the oxides including silicon, magnesium, and calcium.

Known methods can be used to fabricate a single crystal. The examples include a floating zone melt method, a micro-pulling-down method, a pulling method, a skull melting method, a Bridgeman method, and the like. For details on each of these methods, see "Advanced Growth Technology and Application of Bulk Single Crystal" (supervised by Tsuguo Fukuda, CMC Publishing Co., Ltd., March 2006) and "Crystal Growth Handbook" (edited by the Editorial Committee of "Crystal Growth Handbook" of the Japanese Association for Crystal Growth, Kyoritsu Shuppan Co., Ltd., September 1995).

In the preparation of a single crystal, an oxide of an alkaline earth metal (for example, magnesium, calcium, strontium, or barium) may be doped for the purpose of stable crystallization.

When the obtained single crystal is used as the Faraday rotator of the optical isolator, it is preferable to apply mirror finish to the surface with a polishing agent or the like after cutting. Although the polishing agent is not particularly limited, colloidal silica is an example.

Conventionally known fabrication methods can appropriately be selected and used for the preparation of a ceramic. Major fabrication methods include a hot isostatic pressing processing, a combination of a solid-phase method and a press-forming method, a method vacuum sintering is performed by using mold forming and the like, etc. The details are described in Akio Ikesue, "Single Crystal to Polycrystalline Materials with Optical Grade", Applied Physics, Vol. 75, No. 5, 579-583 (2006); Takagimi Yanagitani and Hideki Yagi, "Current State and Future of Ceramic Laser Material", The Review of Laser Engineering, Vol. 36, No. 9, 544-548 (2008); etc.

After forming, it is also preferable to perform a degreasing process by heating (preferably at 400 to 1,000° C.). Sintering conditions can be 1,380 to 1,780° C. in an oxygen atmosphere furnace for 1 to 40 hours. After sintering, it is also effective to perform processing by a hot isostatic pressing (HIP) method to further increase transparency. The processing temperature is preferably lower than the aforementioned sintering temperature and can be 1,000 to 1,750° C. In addition, the processing pressure in this case can be 100 to 200 MPa. Although not particularly limited, the processing time can be 4 hours or less. Since the transparent ceramic sintered body thus obtained still has a gray appearance due to F-center absorption caused by oxygen deficiency, it is also effective to subsequently perform an annealing process in an atmospheric furnace. The annealing temperature is preferably 1300 to 1700° C., and the process time is preferably 3 hours or more.

The Faraday rotator that can be used in the present invention preferably has an insertion loss of 1 dB or less and an extinction ratio of 30 dB or more for the optical path length L (cm) that satisfies the formula (2) in the optical isolator of the present invention after applying anti-reflective coating (AR coating) to both end surfaces (light transmission surfaces) of the rod of the rotator. The above range is preferable from the viewpoint of enabling fabrication of an optical isolator with optical properties including a low loss and high isolation. The smaller the above insertion loss is the better, and it can be 0.05 dB or more, for example. Although the upper limit of the above extinction ratio is not particularly limited, the above extinction ratio can be, for example, between 30 dB and 50 dB, inclusive.

It should be noted that the optical properties such as an insertion loss and an extinction ratio are measured at a wavelength of 400 to 470 nm in accordance with the usual method. The measurement is performed in atmosphere under the measurement conditions of 25±10°.

The Faraday rotator that can be used in the present invention preferably has a transmittance (transmittance of light) of 80% or more, preferably 82% or more, and yet more preferably 85% or more at a wavelength of 400 to 470 nm for the above optical path length L cm (0.26≤L≤0.50). A high transmittance is preferable; the upper limit thereof is not particularly limited and the transmittance may be 100% or less.

The transmittance is measured by the intensity of light when the light at a wavelength of 400 to 470 nm is transmitted through the Faraday rotator with thickness (optical path length) of L(cm). In other words, the transmittance is represented by the following formula, $$\text{Transmittance} = I/Io \times 100$$

(wherein I represents the intensity of transmitted light (intensity of light transmitted through a sample with thickness of L cm) and Io represents the intensity of incident light).

If the transmittance of the Faraday rotator is not uniform and varies depending on a measurement point, the average transmittance of 10 arbitrary points is used as the transmittance of the Faraday rotator.

Additional description of the hollow magnet included in the optical isolator of the present invention is provided below.

The hollow magnet is preferably a permanent magnet as small as possible, and it is preferable to select, as the magnet material, a neodymium-iron-boron (NdFeB) magnet having a larger magnetic flux density than a ferrite magnet or a samarium-cobalt magnet. Furthermore, by housing the hollow magnet in a stainless steel case and integrating it with a stainless steel member around the case by laser welding, it is possible to configure a more compact laser module with a stronger fixing strength.

In the basic design of the optical isolator of the present invention, it is important to shorten the length of the Faraday rotator for miniaturization. For this purpose, a combination of a Faraday rotator with the large Faraday effect and a magnet shape with a small magnetic flux density is used, thereby enabling to provide a sufficiently miniaturized optical isolator.

In the optical isolator of the present invention, it is preferable to provide, as the polarizers, two or more polarizing beam splitters (PBS) on the optical axis. This configuration allows the isolator to be polarization-dependent. For example, the input polarizer 1 and the output polarizer 3 shown in FIG. 1 may be the PBS.

Furthermore, the transmittance of light having a wavelength of 400 to 470 nm through the PBS is preferably 90% or more, preferably 92% or more, and even more preferably 95% or more. The high transmittance is preferable, and the upper limit thereof is not particularly limited and the transmittance may be 100% or less. Other common polarizers include a glass polarizer, but it is not preferable for use as the polarizer since absorbance of the doped metal particles becomes extremely large and the transmittance is 50% or less at a wavelength of 400 to 470 nm.

As the polarizer, it is preferable to use a polarizing beam splitter having an insertion loss of 0.5 dB or less and an extinction ratio of 30 dB or more. This results in optical properties including a lower loss and higher isolation. Though the smaller insertion loss of the polarizer is more preferable, it can be, for example, 0.05 dB or more. Although the upper limit of the extinction ratio of the polarizer is not particularly limited, the extinction ratio of the polarizer can be, for example, between 30 dB and 50 dB, inclusive.

EXAMPLES

Hereinafter, the present invention will be specifically described with reference to Examples and Comparative Examples. However, the present invention is not limited thereto.

Example 1

An optical isolator for 460 nm band having the configuration shown in FIG. 1 was fabricated.

A polarizing beam splitter (PBS) with high transparency/extinction ratio at 460 nm was used as the input polarizer 1 and the output polarizer 3, and an antireflection film with a center wavelength of 460 nm was applied to the light transmission surface thereof. Furthermore, four corners of the bottom of each of the polarizers 1 and 3 were adhered and fixed together on the polarizer holder 4 with a tilt angle of only 4° to prevent the light reflected by the light transmission surface from returning to the incident light path. The polarizer holder 4 to which each of the polarizers 1 and 3 was adhered and fixed was inserted into the metal holder 5.

Further, the Faraday rotator 2 was positioned at the center of the hollow portion of the hollow magnet 7 and fixed to the position where maximum magnetic field distribution was formed by the magnet. The optical axes of the input polarizer 1 and the output polarizer 3 in this order along the incident light path was adjusted such that the maximum isolation properties could be obtained in accordance with the polarization angle of 45° rotated after transmission through the Faraday rotator 2, and the outer peripheral joint of the polarizer holder 4 and the metal holder 5 was fixed by laser welding. Note that an antireflection film with a center wavelength of 460 nm was applied to the light transmission surface of the Faraday rotator 2.

As the Faraday rotator 2, a $(Tb_{0.5}R_{0.5})_2O_3$ oxide (R=Y (yttrium)) with a Verdet constant of 760 Rad/T·m at a wavelength of 460 nm was used and positioned so as to give an optical path length L of 0.48 cm. The wavelength characteristics of the rotator before AR coating are illustrated in FIG. 2. As can clearly be seen from FIG. 2, it was recognized that the rotator had a transmittance of 79% at 460 nm and subsequently had a high transmittance of 90% after the AR coating was applied.

The hollow magnet 7 made of a neodymium-iron-boron (NdFeB) was provided on the outer periphery of the Faraday rotator 2. A stainless steel case was provided as the metal holder 5 outside the magnet and the magnet unit. Thus, the optical isolator 10 of Example 1 was fabricated.

Next, the details of the Faraday rotator 2 used in Example 1 will be described. The material used was a $(Tb_{0.5}R_{0.5})_2O_3$ ceramic (R=Y (yttrium)) containing 50% by weight of a terbium oxide. The ceramic was measured at a wavelength of 460 nm and was found to have optical properties including an insertion loss of 0.45 dB, an extinction ratio of 40 dB, and a Verdet constant of 760 Rad/T·m. Note that the sample measured in this case has a cylindrical shape with an outer diameter of 0.44 cm and a length of 0.48 cm.

Example 2

In Example 2, the optical isolator 10 of Example 2 was fabricated in the same manner as in Example 1, except that a $(Tb_{0.6}R_{0.4})_2O_3$ oxide (R=Y (yttrium)) was used as the Faraday rotator 2, which had a Verdet constant of 840 Rad/T·m at a wavelength of 460 nm.

In addition, the material of the Faraday rotator used in Example 2 was a $(Tb_{0.6}R_{0.4})_2O_3$ ceramic (R=Y (yttrium)) containing 60% by weight of a terbium oxide. The ceramic was measured at a wavelength of 460 nm and was found to have optical properties including an insertion loss of 0.48 dB, an extinction ratio of 40 dB, and a Verdet constant of 840 Rad/T·m. The sample measured in this case has a cylindrical shape with an outer diameter of 0.44 cm and a length of 0.40 cm.

FIG. 3 shows the magnetic flux density B (T $(=10^4$ Oe)) as a function of the optical path length L (cm), which gives the Faraday rotation angle of 45° when the optical path length L of the ceramic used in each of Examples 1 and 2 was varied by 0.02 cm between 0.26 and 0.50 cm. When the optical path length L was 0.50 cm, the magnetic flux density which gives the Faraday rotation angle of 45° was calculated from the Verdet constant value of 760 Rad/T·m in Example 1 and the required magnetic flux density was found to be about 0.20 [T]. In addition, when the optical path length L as the lower limit of the present invention was 0.26 cm, the magnetic flux density was 0.40 [T] and it was found that all of these satisfy the formula (1): B≤0.40. Similarly, when the optical path length L was 0.50 cm, the magnetic flux density which gives the Faraday rotation angle of 45° was calculated from the Verdet constant value of 840 Rad/T·m in Example 2, and the required magnetic flux density was found to be about 0.16 [T]. Further, when the optical path length as the lower limit of the present invention was 0.26 cm, the magnetic flux density was about 0.31 [T], and it was found that all of these satisfy the formula (1): B≤0.40.

Employed as the magnet satisfying the magnetic flux density (0.21 [T]) in Example 1 was neodymium-iron-boron (NdFeB) manufactured by Shin-Etsu Chemical Co., Ltd., and found to have a shape with a magnet outer diameter of 1.0 cm, an inner diameter of 0.45 cm, and a length of 0.6 cm.

Furthermore, in Example 1, when the optical isolator was assembled as described above, the optical isolator having an insertion loss of 0.60 [dB] and isolation (extinction ratio) of 38 [dB] at a wavelength of 460 nm was obtained. The optical isolator of Example 2 had optical properties including an insertion loss of 0.63 [dB] and isolation of 38 [dB].

Comparative Example 1

As Comparative Example 1, an optical isolator was fabricated using a TGG single crystal (Verdet constant of 380 Rad/T·m) as a Faraday rotator. When calculating the magnetic flux density to be applied to this TGG single crystal, the magnetic flux density required for the optical path length of 0.5 cm was found to be about 0.41[T], as shown in FIG. 3. To calculate the shape of the magnet as in Example 1, the simulation results of the magnetic flux density distribution obtained with an outer diameter of 2.5 cm and a length (MT) as a parameter are shown in FIG. 4. As a result, it was found that the shape of the magnet satisfying the magnetic flux density in Comparative Example 1 had an outer diameter of 2.5 cm, an inner diameter of 0.4 cm, and a length of 1.0 cm. Here, the position Z [mm] in FIG. 4 indicates the distance from the center on the optical axis 6 in FIG. 1, and the optical path length [cm] is determined by 2×Z/10.

FIG. 2 also shows the wavelength characteristics of the TGG single crystal with an optical path length of 0.5 cm. The TGG single crystal had a transmittance of 78% at a wavelength of 460 nm, and the transmittance was 89% after AR coating was applied. When measuring this TGG single crystal at a wavelength of 460 nm, it had optical properties including an insertion loss of 0.50 [dB] and an extinction ratio of 36 [dB]. Furthermore, when the optical isolator was assembled as described above, it had optical properties including an insertion loss of 0.65 [dB] and isolation of 34 [dB].

When comparing Examples 1 and 2 with Comparative Example 1, it was found that Examples 1 and 2 as examples of the present invention were characterized by a low loss and high isolation and achieved size reduction of 90% by volume, as compared to the TGG optical isolator of Comparative Example 1.

It is also generally known that the Verdet constant is wavelength-dependent and becomes smaller at a longer wavelength. Therefore, the Verdet constant was also evaluated at 470 nm, which was the upper limit of the wavelength of 400 to 470 nm. As a result, it was found that the TGG of Comparative Example 1 was 370 Rad/T·m, whereas Example 1 had performance of 750 Rad/T·m, which was more than twice the 370 Rad/T·m. Example 2 was also found to have performance of 820 Rad/T·m, which was 2.2 times or higher. Accordingly, it is indicated that the optical isolator of the present invention can function as a sufficiently miniaturized optical isolator while each of the components used and the configurations thereof are characterized by a low loss and high isolation at a band of 400 to 470 nm.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. An optical isolator for a wavelength band of 400 to 470 nm, comprising:
    a Faraday rotator having a Verdet constant equal to or greater than 750 Rad/T·m at a wavelength of 400 nm to 470 nm; and
    a hollow magnet provided on an outer periphery of the Faraday rotator,
    wherein a magnetic flux density $B(T)$ applied to the Faraday rotator is within the range of the following formula (1), and
    an optical path length $L(cm)$ over which the Faraday rotator is provided is within the range of the following formula (2).

$$B \leq 0.40 \quad (1), \text{ and}$$

$$0.26 \leq L \leq 0.50 \quad (2).$$

2. The optical isolator according to claim 1, wherein the Faraday rotator contains 95% or more of an oxide represented by the following formula (I), $$(Tb_xR_{1-x})_2O_3 \quad (I), \text{ and}$$

wherein x satisfies $0.5 \leq x \leq 1.0$, and R contains at least one element selected from the group consisting of scandium, yttrium, and lanthanoid elements other than terbium.

3. The optical isolator according to claim 2, wherein the oxide is a single crystal.

4. The optical isolator according to claim 3, wherein the Faraday rotator has an insertion loss of 1 dB or less and an extinction ratio of 30 dB or more for the optical path length $L(cm)$ that satisfies the formula (2).

5. The optical isolator according to claim 4, further comprising a pair of polarizers provided so as to sandwich the Faraday rotator therebetween along an optical axis,
    wherein each of the polarizers is a polarizing beam splitter having an insertion loss of 0.5 dB or less and an extinction ratio of 30 dB or more.

6. The optical isolator according to claim 3, further comprising a pair of polarizers provided so as to sandwich the Faraday rotator therebetween along an optical axis,
    wherein each of the polarizers is a polarizing beam splitter having an insertion loss of 0.5 dB or less and an extinction ratio of 30 dB or more.

7. The optical isolator according to claim 2, wherein the oxide is a ceramic.

8. The optical isolator according to claim 7, wherein the Faraday rotator has an insertion loss of 1 dB or less and an extinction ratio of 30 dB or more for the optical path length $L(cm)$ that satisfies the formula (2).

9. The optical isolator according to claim 8, further comprising a pair of polarizers provided so as to sandwich the Faraday rotator therebetween along an optical axis,
    wherein each of the polarizers is a polarizing beam splitter having an insertion loss of 0.5 dB or less and an extinction ratio of 30 dB or more.

10. The optical isolator according to claim 7, further comprising a pair of polarizers provided so as to sandwich the Faraday rotator therebetween along an optical axis,
    wherein each of the polarizers is a polarizing beam splitter having an insertion loss of 0.5 dB or less and an extinction ratio of 30 dB or more.

11. The optical isolator according to claim 2, wherein the Faraday rotator has an insertion loss of 1 dB or less and an extinction ratio of 30 dB or more for the optical path length $L(cm)$ that satisfies the formula (2).

12. The optical isolator according to claim 11, further comprising a pair of polarizers provided so as to sandwich the Faraday rotator therebetween along an optical axis,
    wherein each of the polarizers is a polarizing beam splitter having an insertion loss of 0.5 dB or less and an extinction ratio of 30 dB or more.

13. The optical isolator according to claim 2, further comprising a pair of polarizers provided so as to sandwich the Faraday rotator therebetween along an optical axis,
    wherein each of the polarizers is a polarizing beam splitter having an insertion loss of 0.5 dB or less and an extinction ratio of 30 dB or more.

14. The optical isolator according to claim 1, wherein the Faraday rotator has an insertion loss of 1 dB or less and an extinction ratio of 30 dB or more for the optical path length $L(cm)$ that satisfies the formula (2).

15. The optical isolator according to claim 14, further comprising a pair of polarizers provided so as to sandwich the Faraday rotator therebetween along an optical axis,
    wherein each of the polarizers is a polarizing beam splitter having an insertion loss of 0.5 dB or less and an extinction ratio of 30 dB or more.

16. The optical isolator according to claim 1, further comprising a pair of polarizers provided so as to sandwich the Faraday rotator therebetween along an optical axis,
    wherein each of the polarizers is a polarizing beam splitter having an insertion loss of 0.5 dB or less and an extinction ratio of 30 dB or more.

* * * * *